United States Patent
Hoffart

(10) Patent No.: US 6,299,265 B1
(45) Date of Patent: Oct. 9, 2001

(54) REPLACEABLE TIRE GRIPPING SYSTEM FOR ENDLESS TRACK

(76) Inventor: Ronald J. Hoffart, 755-2nd Ave. Northwest, West Fargo, ND (US) 58078

( * ) Notice: Subject to any disclaimer, the term of this patent is extended or adjusted under 35 U.S.C. 154(b) by 0 days.

(21) Appl. No.: 09/472,570

(22) Filed: Dec. 27, 1999

(51) Int. Cl.⁷ .......................... B60B 15/00; A01B 33/00; B62D 55/28; B60C 11/00
(52) U.S. Cl. ........................ 305/187; 305/189; 305/191; 305/19; 152/225 R
(58) Field of Search ............................ 152/225 R; 305/7, 305/19, 187 I, 188, 189, 191

(56) References Cited

U.S. PATENT DOCUMENTS

| | | | | |
|---|---|---|---|---|
| 2,973,995 | * | 3/1961 | Weier | 305/19 |
| 3,773,394 | * | 11/1973 | Grawey | 305/19 |
| 3,871,720 | * | 3/1975 | Mosshart et al. | 305/189 |
| 4,050,495 | * | 9/1977 | Olsen | 305/19 |
| 4,480,670 | * | 11/1984 | Payne | 305/19 |
| 5,076,335 | * | 12/1991 | Koshi | 152/225 R |
| 5,513,684 | * | 5/1996 | Laub | 152/225 R |

* cited by examiner

Primary Examiner—S. Joseph Morano
Assistant Examiner—Jason R. Bellinger
(74) Attorney, Agent, or Firm—Michael S. Neustel

(57) ABSTRACT

A replaceable tire gripping system for endless track for extending the useful life and operation of an endless track with grouser members. The inventive device includes a grouser bar having a first side and a second side, a pair of side walls attached to opposing ends of the grouser bar, a plurality of openings within the grouser bar, a plurality of grip members positionable within the plurality of openings with a portion exposed through the second side of the grouser bar, and a wear plate attached to the first side of the grouser bar for retaining the grip members within the openings. The openings and the grip members are preferably tapered for allowing the broad end of the grip members to be substantially flush with the first side and the wear plate.

20 Claims, 9 Drawing Sheets

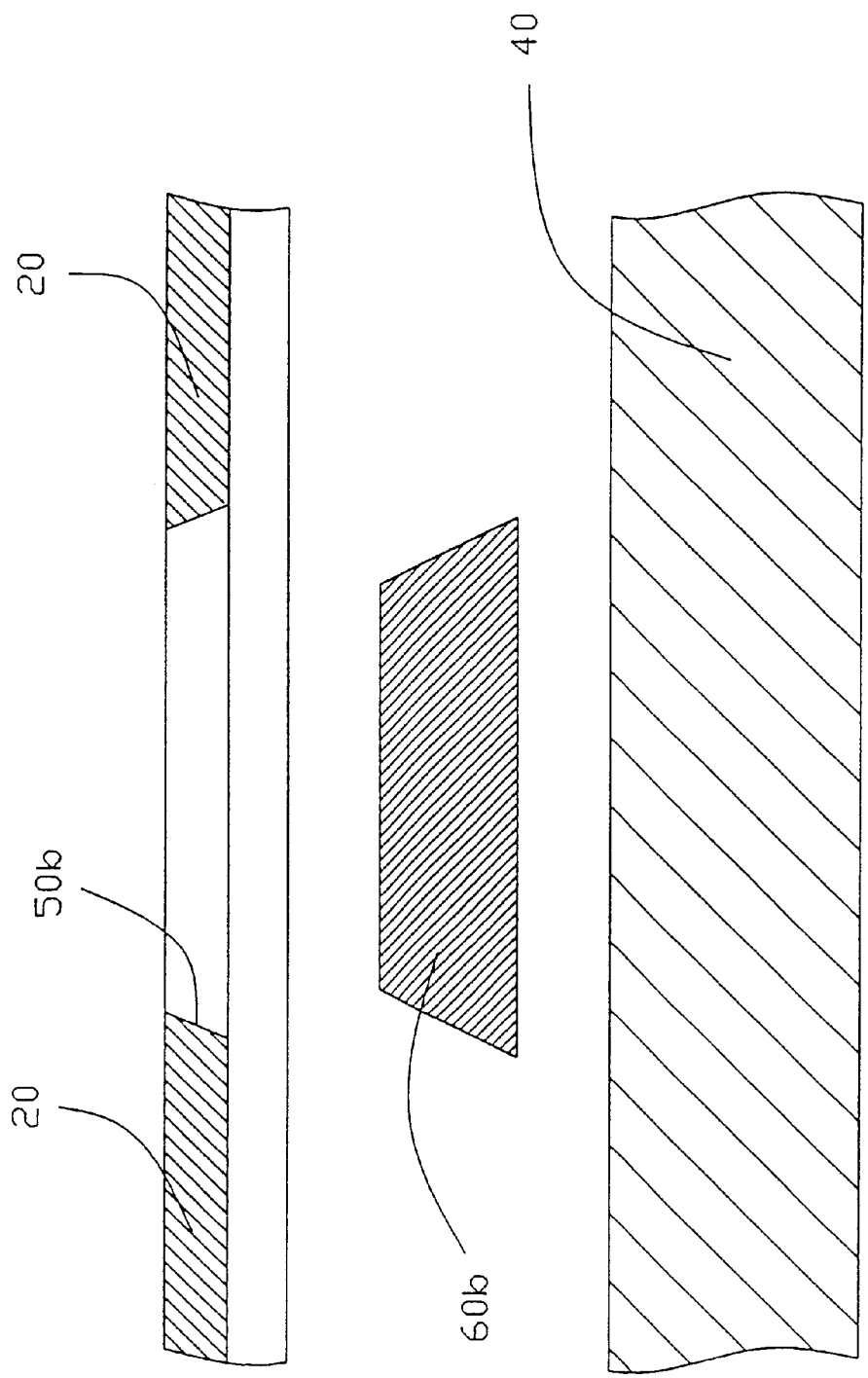

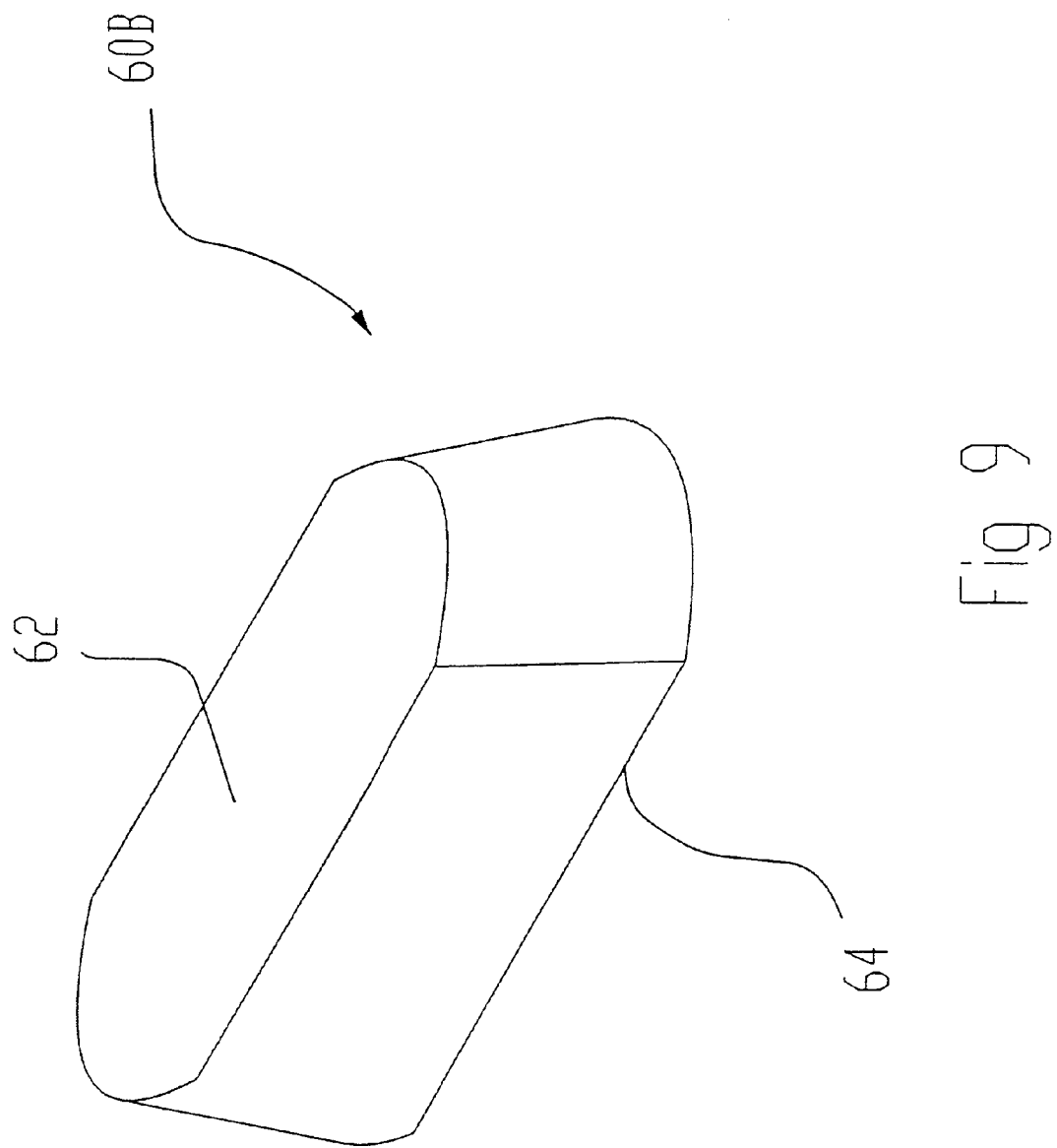

REPLACEABLE TIRE GRIPPING SYSTEM FOR ENDLESS TRACK

BACKGROUND OF THE INVENTION

1. Field of the Invention

The present invention relates generally to endless tracks with grouser members and more specifically it relates to a replaceable tire gripping system for endless track for extending the useful life and operation of an endless track with grouser members.

2. Description of the Prior Art

Endless tracks with grouser members have been in use for years. Typically, the endless track comprises a plurality of grouser pads pivotally attached to one another by a plurality of links. The endless track surrounds the two tires upon the side of a skid-steer loader. There is also another endless track on the opposing side of the tractor that surrounds the pair of tires on that side of the tractor. To reduce slippage of the tires within the endless track, gripping ridges are molded and formed directly into the grouser members of the endless track to grip the tires during operation.

The main problem within conventional endless tracks with grouser members is that the gripping ridges become worn after usage of the track in various conditions. When the ridges become worn, the tires within the endless track begin to slip thereby decreasing the performance of the endless track and decreasing tire life. The owner of the skid-steer tractor has two options when the gripping ridges become worn. The owner can either purchase an entirely new endless track to replace the endless track with the worn gripping ridges, or the owner can weld metal directly upon the grouser members to extend the life of the endless track. Purchasing a new endless track is costly and not desired by most owners. Welding metal to replace the gripping ridges is time consuming and may not be done properly thereby creating additional problems for the owner of the endless track.

While these endless tracks may be suitable for the particular purpose to which they address, they are not as suitable for extending the useful life and operation of an endless track with grouser members. Conventional endless tracks with grouser members do not allow the gripping ridges to be replaced.

In these respects, the replaceable tire gripping system for endless track according to the present invention substantially departs from the conventional concepts and designs of the prior art, and in so doing provides an apparatus primarily developed for the purpose of extending the useful life and operation of an endless track with grouser members.

SUMMARY OF THE INVENTION

In view of the foregoing disadvantages inherent in the known types of endless tracks now present in the prior art, the present invention provides a new replaceable tire gripping system for endless track construction wherein the same can be utilized for extending the useful life and operation of an endless track with grouser members.

The general purpose of the present invention, which will be described subsequently in greater detail, is to provide a new replaceable tire gripping system for endless track that has many of the advantages of the endless tracks mentioned heretofore and many novel features that result in a new replaceable tire gripping system for endless track which is not anticipated, rendered obvious, suggested, or even implied by any of the prior art endless tracks, either alone or in any combination thereof.

To attain this, the present invention generally comprises a grouser bar having a first side and a second side, a pair of side walls attached to opposing ends of the grouser bar, a plurality of openings within the grouser bar, a plurality of grip members positionable within the plurality of openings with a portion exposed through the second side of the grouser bar, and a wear plate attached to the first side of the grouser bar for retaining the grip members within the openings. The openings and the grip members are preferably tapered for allowing the broad end of the grip members to be substantially flush with the first side and the wear plate.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a replaceable tire gripping system for endless track that will overcome the shortcomings of the prior art devices.

A second object is to provide a replaceable tire gripping system for endless track for extending the useful life and operation of an endless track with grouser members.

Another object is to provide a replaceable tire gripping system for endless track that allows worn gripping ridges to be replaced without requiring welding.

An additional object is to provide a replaceable tire gripping system for endless track that extends the useful life of the endless track and tires upon the skid-steer tractor.

A further object is to provide a replaceable tire gripping system for endless track that can easily replace the worn gripping ridges.

Another object is to provide a replaceable tire gripping system for endless track that reduces slippage of the tires within an endless track.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 8 is an exploded view of the cross sectional view of FIG. 6.

FIG. 9 is an upper perspective view of a grip member positionable within a grouser member.

DESCRIPTION OF THE PREFERRED EMBODIMENT

Figure 1:
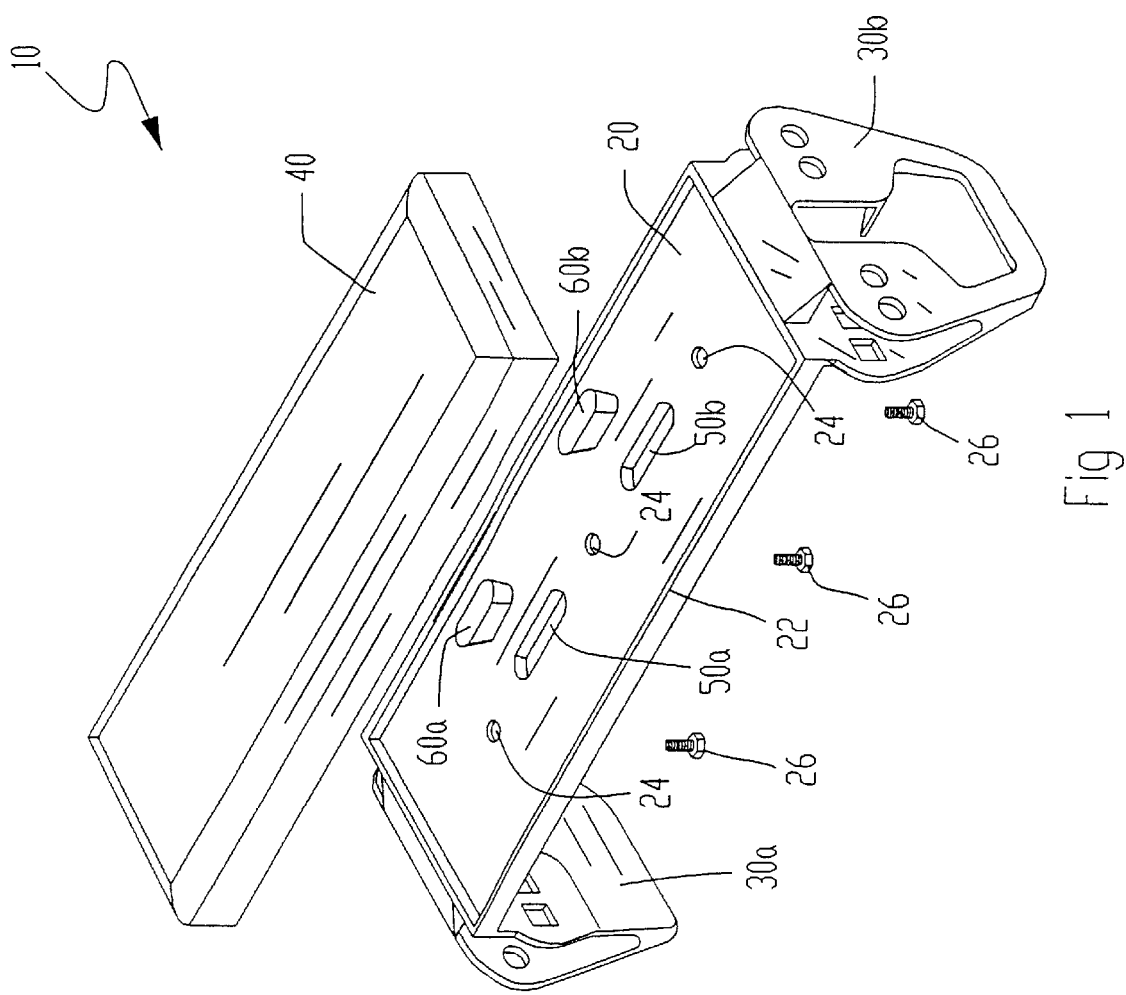
FIG. 1 is an exploded upper perspective view of the present invention.
Figure 2:
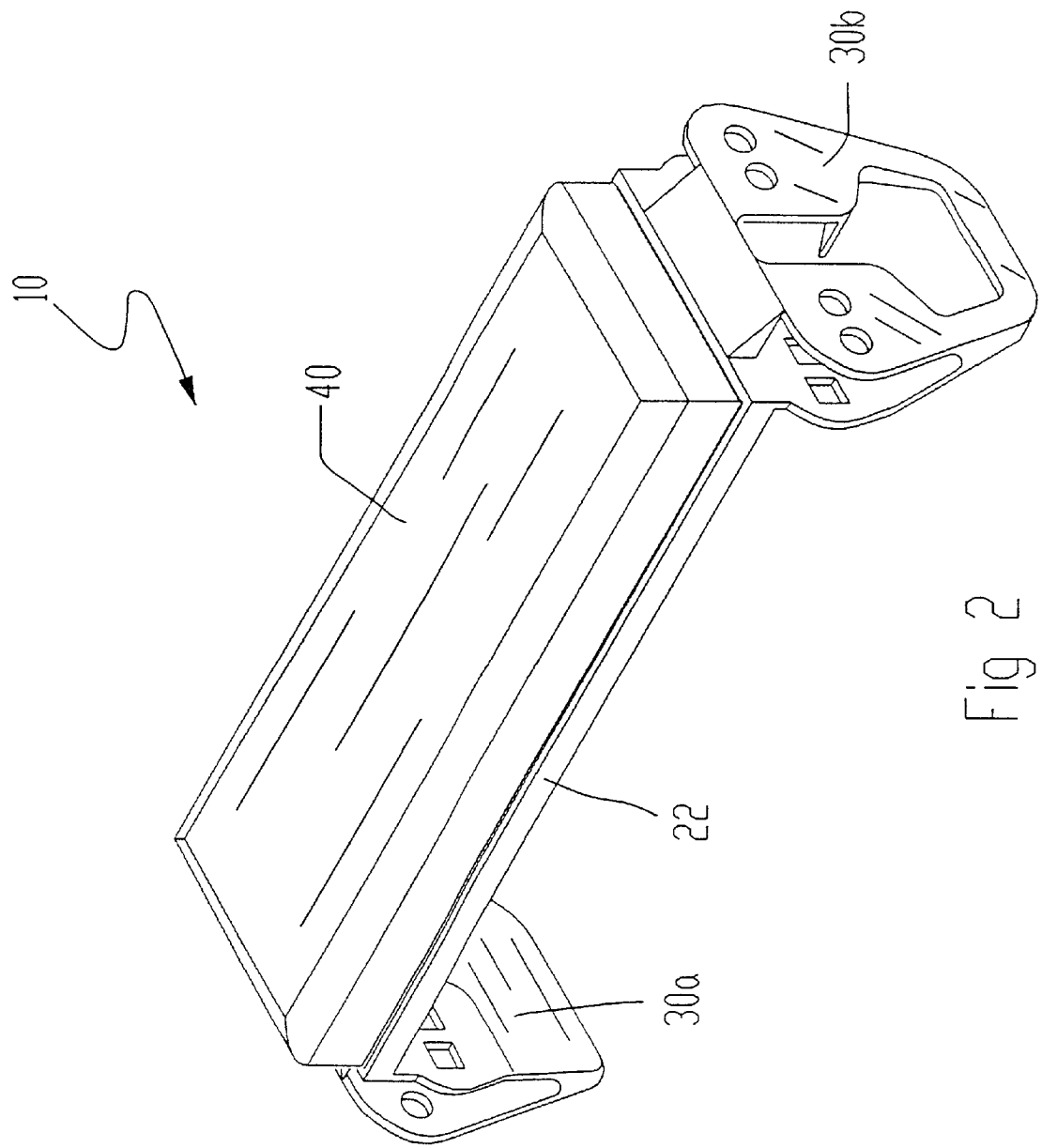
FIG. 2 is an upper perspective view of the present invention.

Turning now descriptively to the drawings, in which similar reference characters denote similar elements throughout the several views, FIGS. 1 through 9 illustrate a replaceable tire gripping system for endless track 10, which comprises a grouser bar 20 having a first side and a second side, a pair of side walls 30a–b attached to opposing ends of the grouser bar 20, a plurality of openings 50a–b within the grouser bar 20, a plurality of grip members 60a–b positionable within the plurality of openings 50a–b with a portion exposed through the second side of the grouser bar 20, and a wear plate 40 attached to the first side of the grouser bar 20 for retaining the grip members 60a–b within the openings 50a–b. The openings 50a–b and the grip members 60a–b are preferably tapered for allowing the broad end 64 of the grip members 60a–b to be substantially flush with the first side and the wear plate 40.

An endless track is comprised of a plurality of track pads pivotally connected by links. Each track pad of the endless track is comprised of at least one grouser bar 20 which the tires of the tractor travel upon. The grouser bar 20 includes a first side and a second side, wherein the first side is engaged by the tires of the skid-steer tractor and shown in FIGS. 3 and 4 of the drawings. The second side typically receives the wear plate 40 as shown in FIG. 1 of the drawings.

As shown in FIGS. 1 through 4 of the drawings showing a sample track pad, a grouser bar 20 extends between a pair of opposing side walls 30a–b. It can be appreciated that more than one grouser bar 20 may extend between the side walls 30a–b. It can be appreciated that there can be various other shapes and designs for the grouser bar 20 and the side walls 30a–b since they are common in the art.

Figure 4:
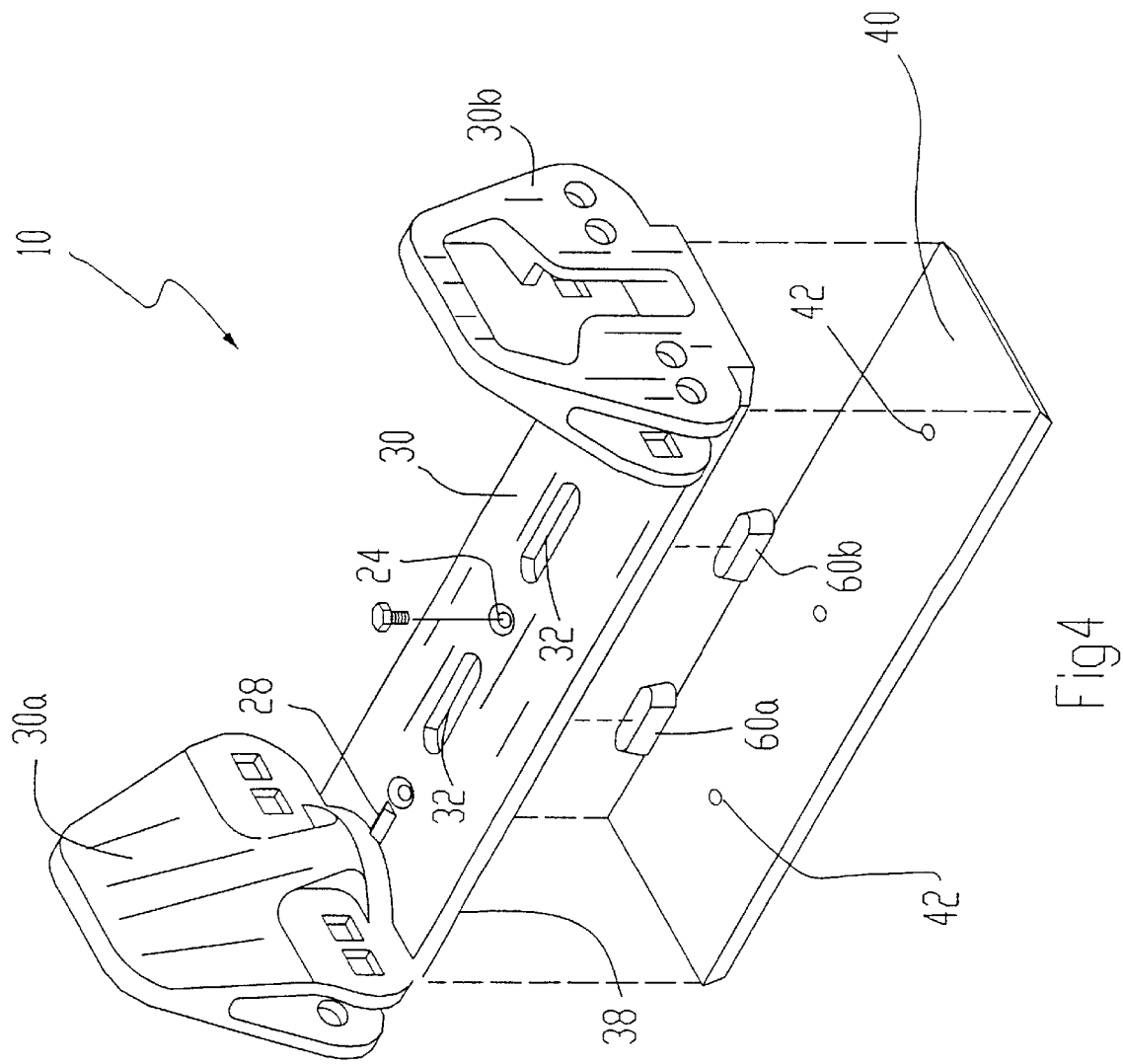
FIG. 4 is an exploded lower perspective view of the present invention.

As best shown in FIG. 1 of the drawings, the grouser bar 20 preferably includes a plurality of apertures 24 for receiving a corresponding number of fasteners 26. The apertures 24 extend completely through the grouser bar 20 from the first side to the second side. As shown in FIG. 4 of the drawings, the fasteners 26 typically are extended through the apertures 24 from the first side and threadably engage threaded couplers 42 within the wear plate 40 thereby retaining the wear plate 40 adjacent the second side of the grouser member. The wear plate 40 may be comprised of any material such as plastic, composite, metal or combination thereof. A perimeter lip 22 may be positioned about the edge of the second side of the grouser bar 20 for preventing debris from accumulating under the wear plate 40.

Figure 3:
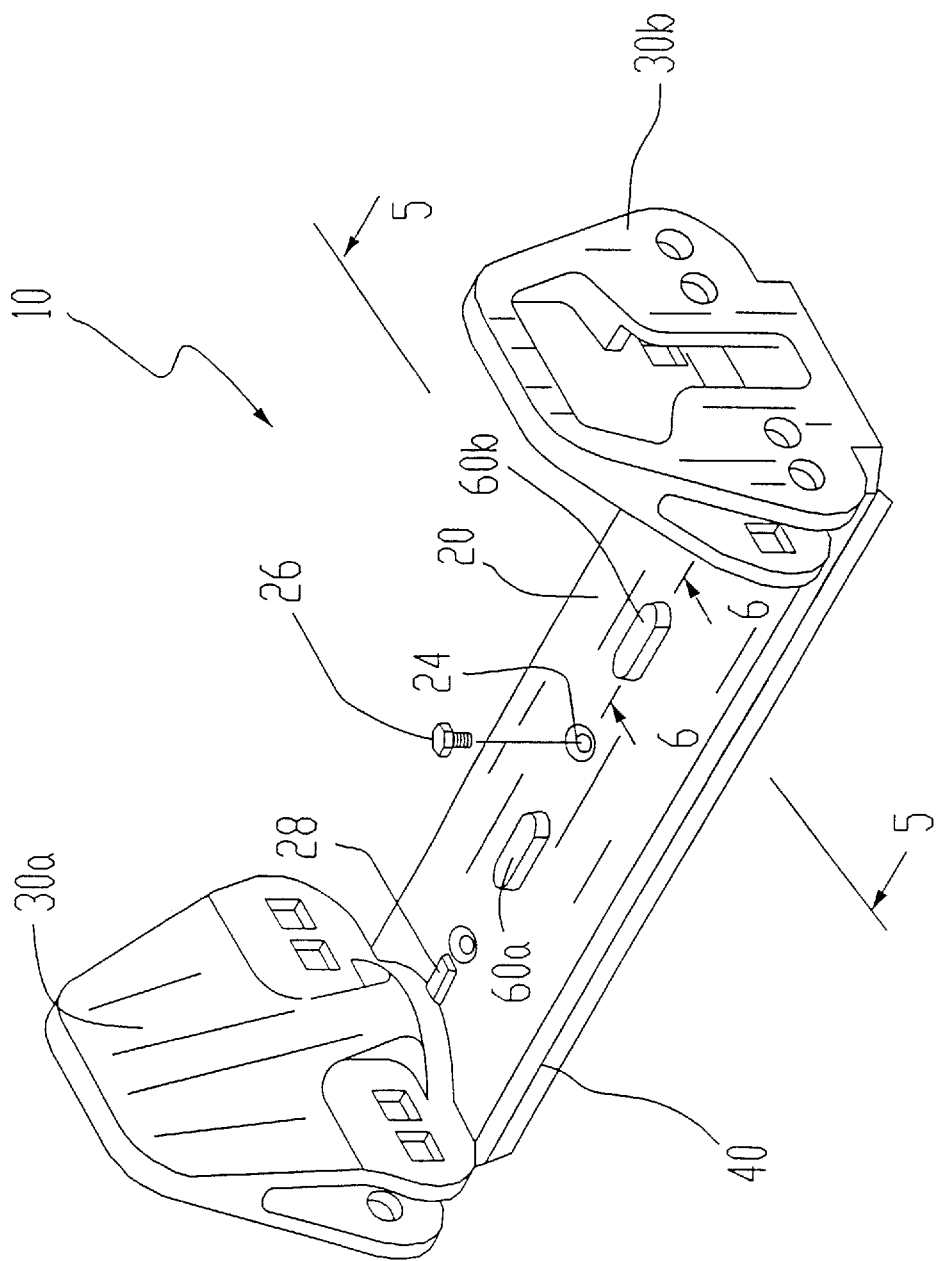
FIG. 3 is a lower perspective view of the present invention.

As shown in FIGS. 3 and 4 of the drawings, the grouser bar 20 may includes one or more permanent gripping 28 upon the first side of the grouser bar 20. The permanent gripping 28 is preferably located within the outer portions of the grouser bar 20 however it can be appreciated that the permanent gripping 28 may be located anywhere upon the grouser bar 20.

As best shown in FIGS. 1 and 4 of the drawings, the grouser bar 20 includes a pair of openings 50a–b that extend through the first side to the second side of the grouser bar 20. It can be appreciated that one or more openings 50a–b may be positioned within the grouser bar 20. The openings 50a–b are formed for snugly receiving the grip members 60a–b.

Figure 6:
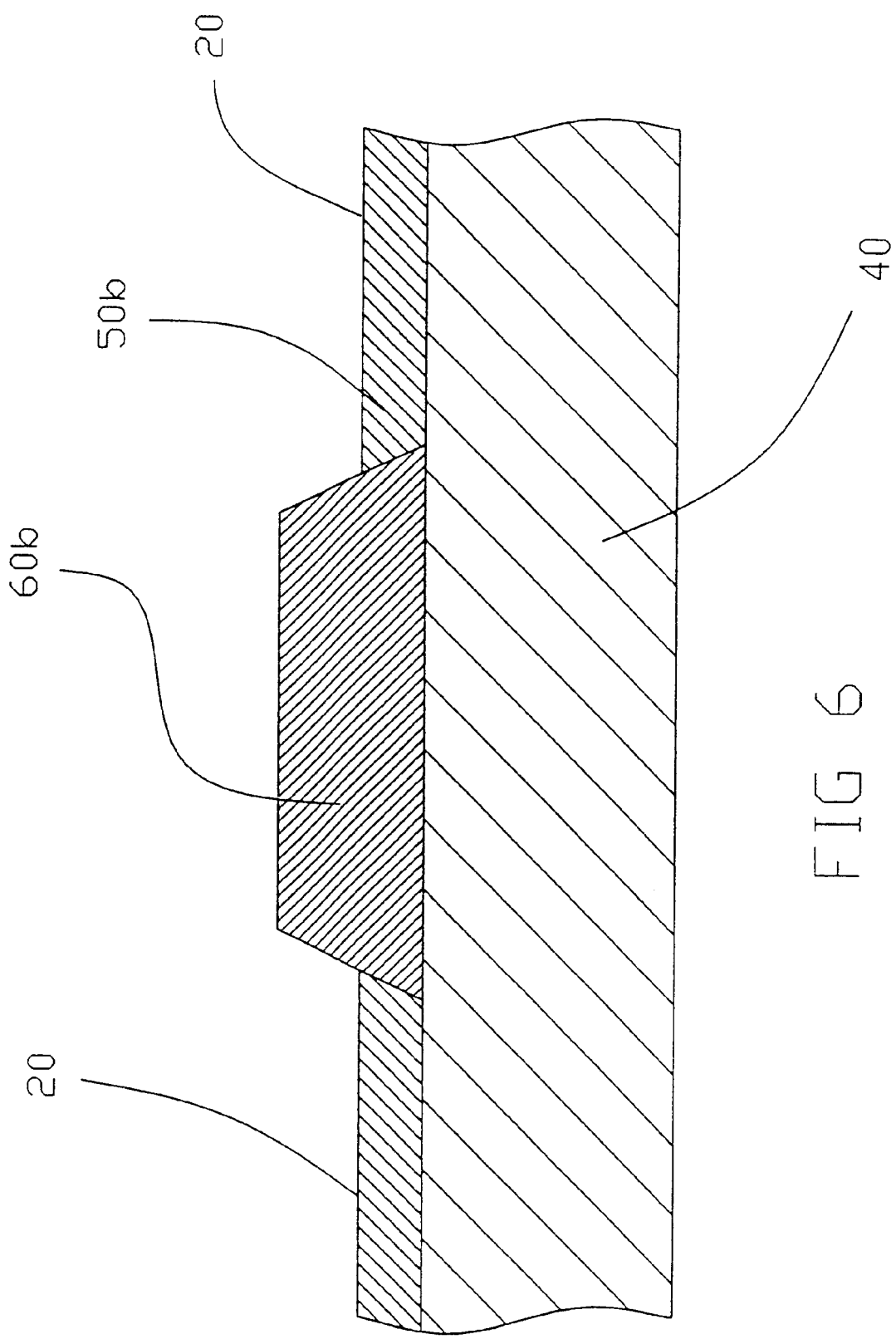
FIG. 6 is a cross sectional view taken along line 6—6 of FIG. 3.
Figure 7:
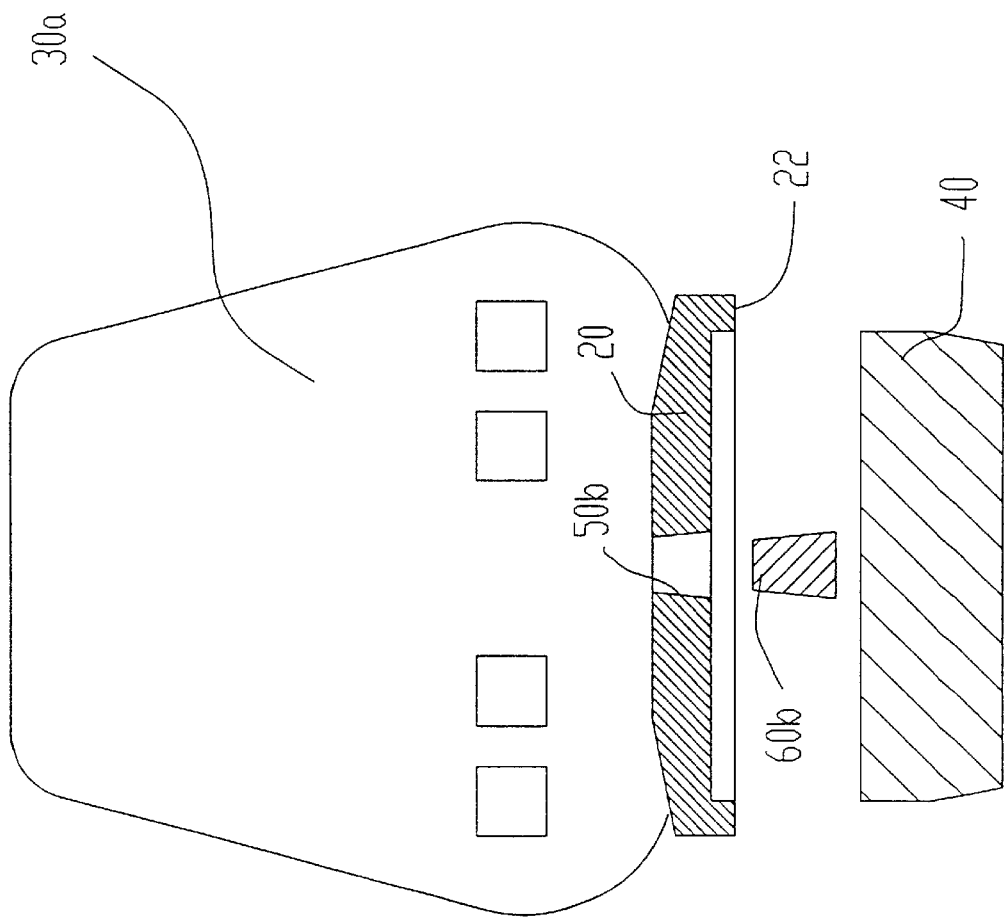
FIG. 7 is an exploded view of the cross sectional view of FIG. 5.

As best shown in FIGS. 7 and 8 of the drawings, openings 50a–b are preferably tapered from the second side to the first side with the broader portion adjacent the second side. The openings 50a–b are formed for receiving the grip members 60a–b as shown in FIG. 6 of the drawings.

Figure 5:
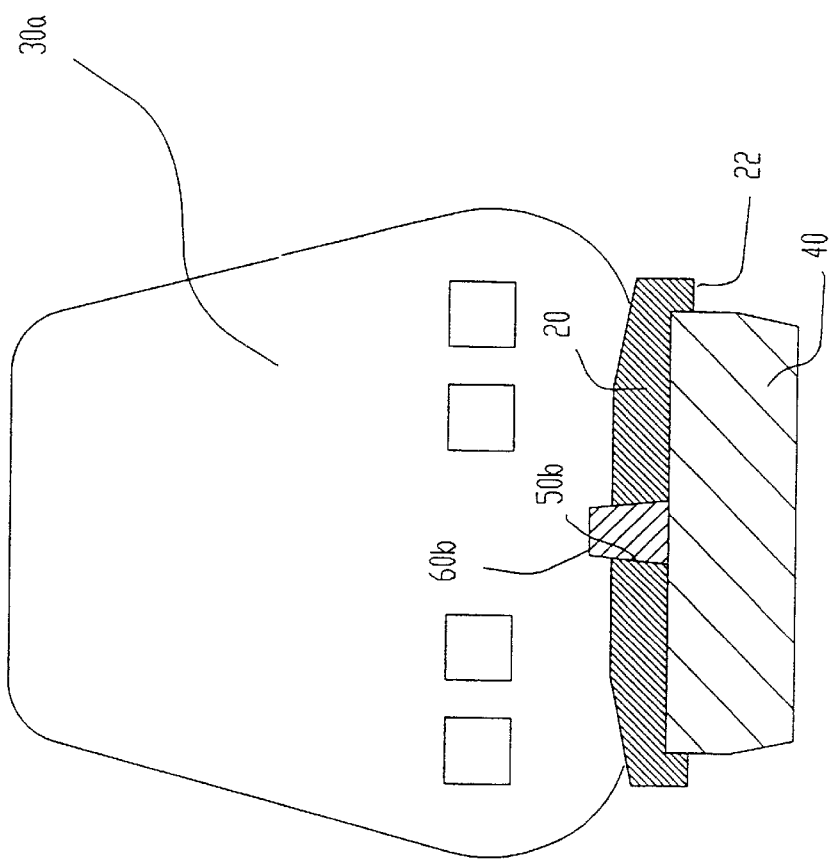
FIG. 5 is a cross sectional view taken along line 5—5 of FIG. 3.

As shown in FIGS. 3 through 9 of the drawings, a corresponding number of grip members 60a–b are removably positioned within the openings 50a–b. The grip members 60a–b are preferably formed to a similar shape of the openings 50a–b. As shown in FIGS. 7 through 9 of the drawings, the grip members 60a–b are tapered similar to the openings 50a–b. The grip members 60a–b have a narrow end 62 and a broad end 64 as best shown in FIG. 9 of the drawings. As shown in FIG. 6 of the drawings, when the gripping members are positioned within the respective openings 50a–b, the narrow end 62 is exposed through the first side of the grouser bar 20 while the broad end 64 is flush with respect to the wear plate 40. The wear plate 40 retains the grip members 60a–b within the openings 50a–b as shown in FIGS. 5 and 6 of the drawings. The gripping members may be comprised of any well-known material.

In an alternative embodiment, the openings 50a–b may have a broader recessed portion into the second side of the grouser bar 20 for receiving a flanged portion of the grip members 60a–b thereby eliminating the need for the openings 50a–b and the grip members 60a–b to be tapered. It can be appreciated that openings 50a–b and the grip members 60a–b may still be tapered along with the recessed portion and the flanged portion for providing increased stability during operation.

In use, the user operates the skid-steer tractor whereby the wheels drive upon the first side of the grouser bar 20 of each of the track pads of the endless track. The tires engage and grip the narrow end 62 of the grip members 60a–b. When the exposed portions of the grip members 60a–b become worn after a period of use, the user then removes the fasteners 26 and then the wear plate 40 from about the grouser member. The user then removes the worn grip members 60a–b from the openings 50a–b within the grouser member. The user then inserts new grip members 60a–b into the openings 50a–b then positions the wear plate 40 upon the second side of the grouser bar 20 with the fasteners 26 threadably engaged thereby maintaining the grip members 60a–b positioned within the openings 50a–b of the grouser bar 20 during operation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

ENVIRONMENTAL ELEMENTS

10. Replaceable Tire Gripping System for Endless Track
20. Grouser Bar
22. Perimeter Lip
24. Apertures
26. Fasteners
28. Permanent Gripping
30. Side Walls (a-b)
40. Wear Plate
42. Threaded Coupler
50. Openings (a-b)
60. Grip Members
62. Narrow End
64. Broad End

I claim:

1. A replaceable tire gripping system for endless track, comprising:
   a grouser bar having a first side and a second side;
   at least one opening within said grouser bar;
   at least one grip member removably positioned within said at least one opening, wherein an exposed portion of said at least one grip member extends through said first side; and
   a plate attached to said second side of said grouser bar for retaining said at least one grip member within said at least one opening.

2. The replaceable tire gripping system for endless track of claim 1, wherein said at least one opening is tapered from said second side to said first side of said grouser bar.

3. The replaceable tire gripping system for endless track of claim 2, wherein said at least one grip member has a narrow end and a broad end.

4. The replaceable tire gripping system for endless track of claim 1, wherein said at least one opening has a recessed portion in said second side of said grouser bar for receiving a flanged portion of said at least one grip member.

5. The replaceable tire gripping system for endless track of claim 1, wherein said at least one grip member is flush with respect to said second side.

6. The replaceable tire gripping system for endless track of claim 5, wherein said at least one grip member has a narrow end and a broad end.

7. The replaceable tire gripping system for endless track of claim 1, wherein said at least one grip member includes a narrow end and a broad end.

8. The replaceable tire gripping system for endless track of claim 1, wherein said at least one opening and said at least one grip member have a corresponding narrow portion and broad portion.

9. The replaceable tire gripping system for endless track of claim 1, wherein said at least one grip member has an elongate width.

10. The replaceable tire gripping system for endless track of claim 1, wherein said exposed portion of said grip member is less than half a height of said at least one grip member.

11. A replaceable tire gripping system for endless track, comprising:
    a grouser bar having a first side and a second side;
    a pair of side walls attached to opposing ends of said grouser bar;
    at least one opening within said grouser bar;
    at least one grip member removably positioned within said at least one opening, wherein a exposed portion of said at least one grip member extends through said first side; and
    a plate attached to said second side of said grouser bar for retaining said at least one grip member within said at least one opening.

12. The replaceable tire gripping system for endless track of claim 11, wherein said at least one opening is tapered from said second side to said first side of said grouser bar.

13. The replaceable tire gripping system for endless track of claim 12, wherein said at least one grip member has a narrow end and a broad end.

14. The replaceable tire gripping system for endless track of claim 11, wherein said at least one opening has a recessed portion in said second side of said grouser bar for receiving a flanged portion of said at least one grip member.

15. The replaceable tire gripping system for endless track of claim 11, wherein said at least one grip member is flush with respect to said second side.

16. The replaceable tire gripping system for endless track of claim 15, wherein said at least one grip member has a narrow end and a broad end.

17. The replaceable tire gripping system for endless track of claim 11, wherein said at least one grip member includes a narrow end and a broad end.

18. The replaceable tire gripping system for endless track of claim 11, wherein said at least one opening and said at least one grip member have a corresponding narrow portion and broad portion.

19. The replaceable tire gripping system for endless track of claim 11, wherein said at least one grip member has an elongate width.

20. The replaceable tire gripping system for endless track of claim 11, wherein said exposed portion of said grip member is less than half a height of said at least one grip member.

* * * * *